United States Patent [19]

McCargar

[11] Patent Number: 6,014,674
[45] Date of Patent: Jan. 11, 2000

[54] METHOD FOR MAINTAINING LOG COMPATIBILITY IN DATABASE SYSTEMS

[75] Inventor: Scott E. McCargar, San Anselmo, Calif.

[73] Assignee: Sybase, Inc., Emeryville, Calif.

[21] Appl. No.: 08/970,117

[22] Filed: Nov. 13, 1997

Related U.S. Application Data

[60] Provisional application No. 60/030,881, Nov. 14, 1996.

[51] Int. Cl.[7] .................................................... G06F 17/40
[52] U.S. Cl. ............................. 707/202; 707/4; 707/203; 707/204; 395/182.18
[58] Field of Search ................................. 707/202, 203, 707/204, 4; 395/182.14, 182.18

[56] References Cited

U.S. PATENT DOCUMENTS

| | | | |
|---|---|---|---|
| 4,507,751 | 3/1985 | Gawlick et al. | 707/202 |
| 4,819,156 | 4/1989 | DeLorme et al. | 707/202 |
| 5,155,678 | 10/1992 | Fukumoto et al. | 707/202 |
| 5,455,946 | 10/1995 | Mohan et al. | 707/202 |
| 5,493,671 | 2/1996 | Pitt et al. | 707/4 |
| 5,564,113 | 10/1996 | Bergen et al. | 707/4 |
| 5,600,834 | 2/1997 | Howard | 707/201 |
| 5,721,915 | 2/1998 | Sockut et al. | 707/200 |
| 5,842,222 | 11/1998 | Lin et al. | 707/202 |
| 5,845,293 | 12/1998 | Veghte et al. | 707/202 |
| 5,848,415 | 12/1998 | Guck | 707/10 |

OTHER PUBLICATIONS

Gray, J. and Reuter, A., "Transaction Processing: Concepts and Techniques," Morgan Kaufmann Publishers, Inc., 1993, pp. 493–524.

*Primary Examiner*—Jean R. Homere
*Attorney, Agent, or Firm*—John A. Smart

[57] ABSTRACT

A relational database system providing improved data structures and methods which operate for translating log records is described. A table of translation functions or methods (pointers) is provided, one per "logop" (i.e., log operation) record type. The logop, which is a single byte value, can be used as an index into the table. During times when a log incompatibility state exists in a database, a Log Compatibility module is invoked for performing appropriate translations. In the client's stack space, hidden from client code, a buffer is provided in which a reformatted log record can be stored. An appropriate translate method installed for the current logop is called; it procures a pointer to that buffer, and reformats the log record into that space. The system returns to the client a pointer to a reformatted log record in its own stack space, with the client largely unaware of the issue. Thus, each logop code indexes (in natural order) into an array or table which, in turn, references particular methods which perform appropriate translation, with the client (caller) receiving a pointer to the translated log record in the client's stack space.

8 Claims, 8 Drawing Sheets

METHOD FOR MAINTAINING LOG COMPATIBILITY IN DATABASE SYSTEMS

The present application claims priority from commonly-owned provisional application serial no. 60/030,881, filed Nov. 14, 1996, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to the process of logging transactions which are posted in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. The general construction and operation of a database management system, including "client/server" relational database systems, is known in the art. See e.g., Date, C., *An Introduction to Database Systems*, Volume I and II, Addison Wesley, 1990; the disclosure of which is hereby incorporated by reference.

Traditionally, database management systems (e.g., the above-described client/server database systems) have been employed for on-line transaction processing (OLTP)—posting data from "transactions" to a database table. As part of this process, OLTP systems typically employ a logging system to log changes which occur to the system. In a commercial embodiment such as Sybase SQL Server System 11, this is done by posting log records to a transaction log. Every transactional operation, including inserts, updates, and deletes, causes a log record to be written to the transaction log or simply "log." In System 11, the transaction log is referred to as "syslogs." Each particular log record characterizes the change which has occurred to the database during processing of a transaction. This information can be used, for instance, in error recovery, to restore the database to a pre-existing, consistent state.

Consider a scenario where a transaction performs updates to a table but then the transaction "rolls back"—that is, aborts. In such a case, the system will undo the updates by reading backwards from the log and reversing the changes which were made (as a result of the updates). The recovery system of databases, therefore, employs the logging system and log records when performing the work of rolling back a transaction. In a similar fashion, the log can be used in the face of a failure, such as when a machine "crashes." As the log is read during recovery, some transactions are re-done on the one hand, while incomplete transactions are undone on the other. In addition to rolling back transactions and supporting error recovery, the log also provides an archive for the database, which documents the specific actions which have led to the current state of the database. All told, the log plays a critical part in the design and implementation of present-day relational database systems.

The logging system itself permits reading from and writing to the log. Write access is typically performed by "access methods" within a relational database system (i.e., a database system which presents data as tables or "relations"). In particular, these methods generate log records which describe actions occurring which affect the database. Read access, on the other hand, is generally provided by a recovery system within the database. In general, therefore, a database system includes subsystems for writing log records into the log and, if needed, reading back those records.

A general description of the design and implementation of a logging system in a relational database is provided by Gray, J. and Reuter, A., *Transaction Processing: Concepts and Techniques*, Morgan Kaufmann Publishers, 1993, the disclosure of which is hereby incorporated by reference. For an overview of relational database systems, see the above-mentioned *An Introduction to Database Systems*, the disclosure of which has been previously incorporated by reference.

A dichotomy exists between data structures in memory and data structures on customers' disks. Designers will often come up with very elegant designs that fall short because such designs run into conflicts with data structures already on existing customers' disks. Such conflicts include, for instance, changes in data page.

Of particular interest herein are changes to log record formats. As described above, the "log" is a special collection of data or files that is used to restore consistency to a database after an unanticipated failure. This is based on the concept of a transaction which creates bounds, a began and an end, for a set of work. The concept of a transaction is fundamental to a DBMS, presenting an all or nothing scenario. Support for this concept is provided by a "write ahead log." Before a change is made to data that can reach disk, the system logs the before and after version of the data and makes sure that that reaches disk first, that is, before the data change itself can reach disk. This concept is generally referred to as "write ahead logging." In this manner, if there is a system failure, upon system recovery the system can detect an incomplete transaction and reverse the changes in that incomplete transaction.

In a DBMS, there are many operations which occur to transform data. In Sybase SQL Server, for instance, each is represented by a log operation code or "logop." Each logop implies its own log record. Here, there is not a single log format, but instead a variety of log record formats. One log record might have several logop formats apply to it. One logop can only have to one of log record apply to it.

Many times, designers have often wanted to add new types of information to log records. As an example, consider the design of Sybase System 11. Here, designers added new fields to certain log records. The fields could not be added at the end because those log records had variable length fields which, by design, are placed at the end of a log record (and there can only be one of them per record). As a result, adding a new field necessarily displaces the pre-existing fields, since the new field must at least go in front of the variable length field. The problem which arises, therefore, is how to maintain compatibility between different versions of a database system.

One approach to the problem is to simply require that log structures not be mixed between new and old versions. In other words, the customer or user is required to have a clean upgrade, so that the user would not employ older log records (e.g., from Sybase System 10 in Sybase System 11). Such an approach is problematic, however. To export information, the prior system would dump database information using a "dump database" command. "Dump" and "load" are the means by which databases are archived against possible media failure. In such prior versions, however, the system required that a recovery phase or "Recovery" be run against the database as part of its operation; this required use of log records.

In addition to dumps for protecting against media failure, database dumps are often used as archives or retiring data. For instance, the user might want to dump data records for a particular year but then, from time to time, load the data for performing historical research. Just as after a system crash, log recovery has to be applied by a load database command. Thus, if System 10 dumps were to be used in System 11, log records would have to be read. Hence, the need for log compatibility.

What is needed are system and methods which preserve log compatibility even when such a system is updated or "upgraded" with a newer database engine, including one which changes the formats of log records. The present invention fulfills this and other needs.

SUMMARY OF THE INVENTION

A relational database system providing improved data structures and methods which operate for translating log records is descibed. A table of translation functions or methods (pointers) is provided, one per "logop" (i.e., log operation) record type. The logop, which is a single byte value, can be used as an index into the table. If desired, a set of translation tables can be defined at run time, one for each version being supported.

During the case that a log incompatibility state exists in a database, a Log Compatibility module is invoked for performing appropriate translations. In the client's stack space, hidden from client code, a buffer is provided in which a reformatted log record can be stored. An appropriate translate method installed for the current logop is called; it procures a pointer to that buffer, and reformats the log record into that space. The system returns to the client a pointer to a reformatted log record in its own stack space, with the client largely unaware of the issue. Thus, each logop code indexes (in natural order) into an array or table which, in turn, references particular methods which perform appropriate translation, with the client (caller) receiving a pointer to the translated log record in the client's stack space.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of logging performance is desirable, including non-SQL database management systems and the like. The description of the exemplary embodiments which follows is, therefore, for the purpose of illustration and not limitation.

Standalone System Hardware

Figure 1A:
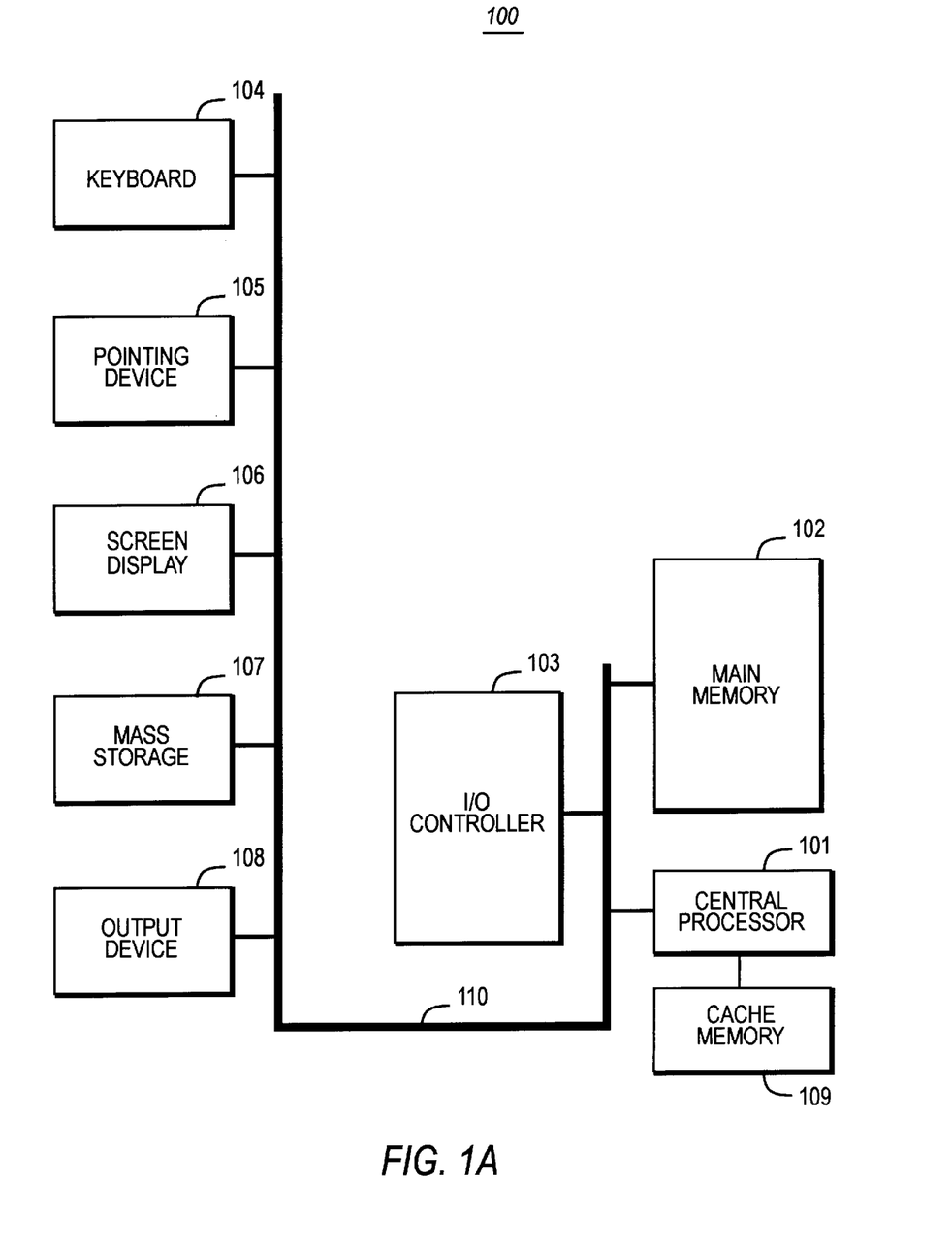
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
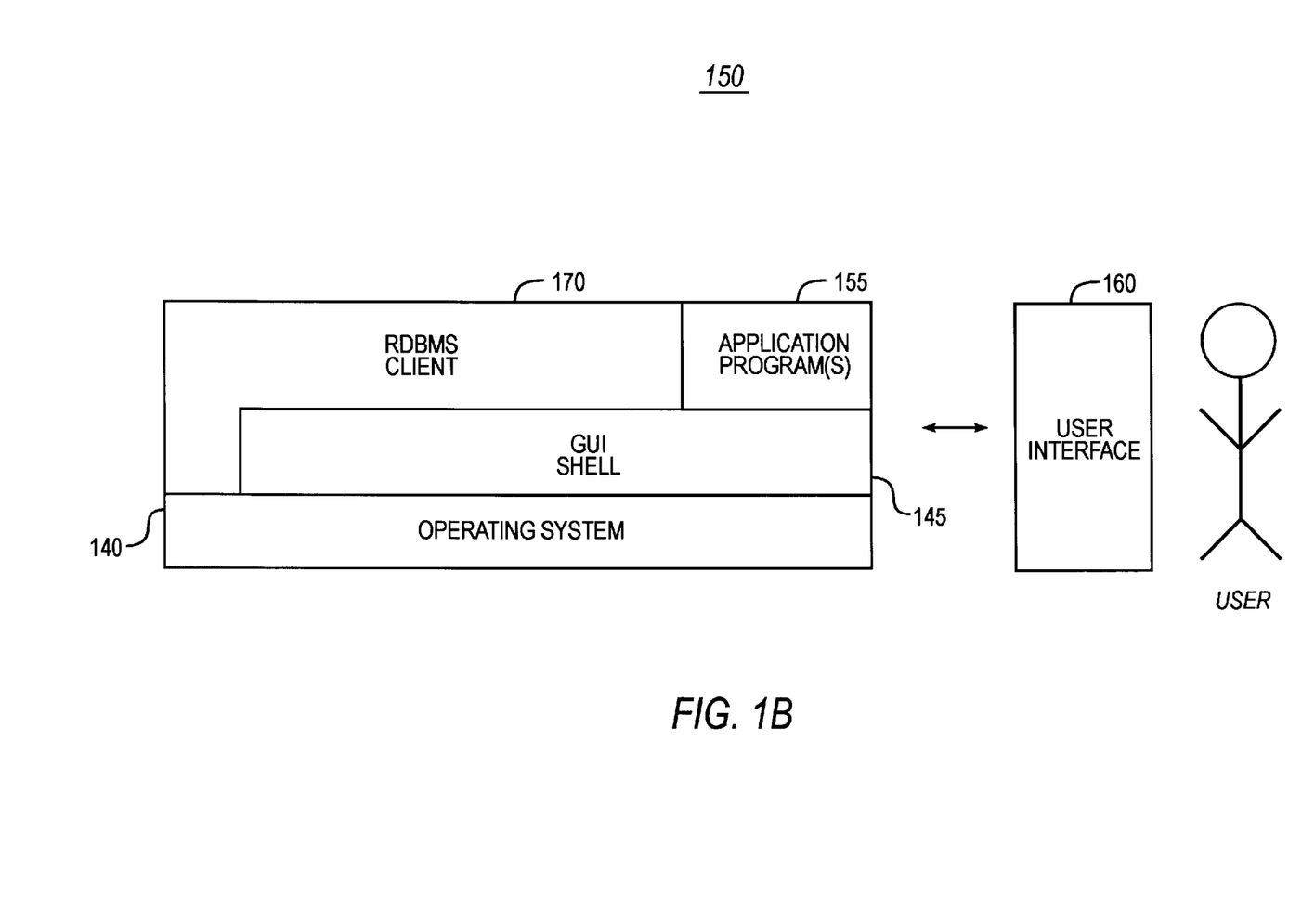
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
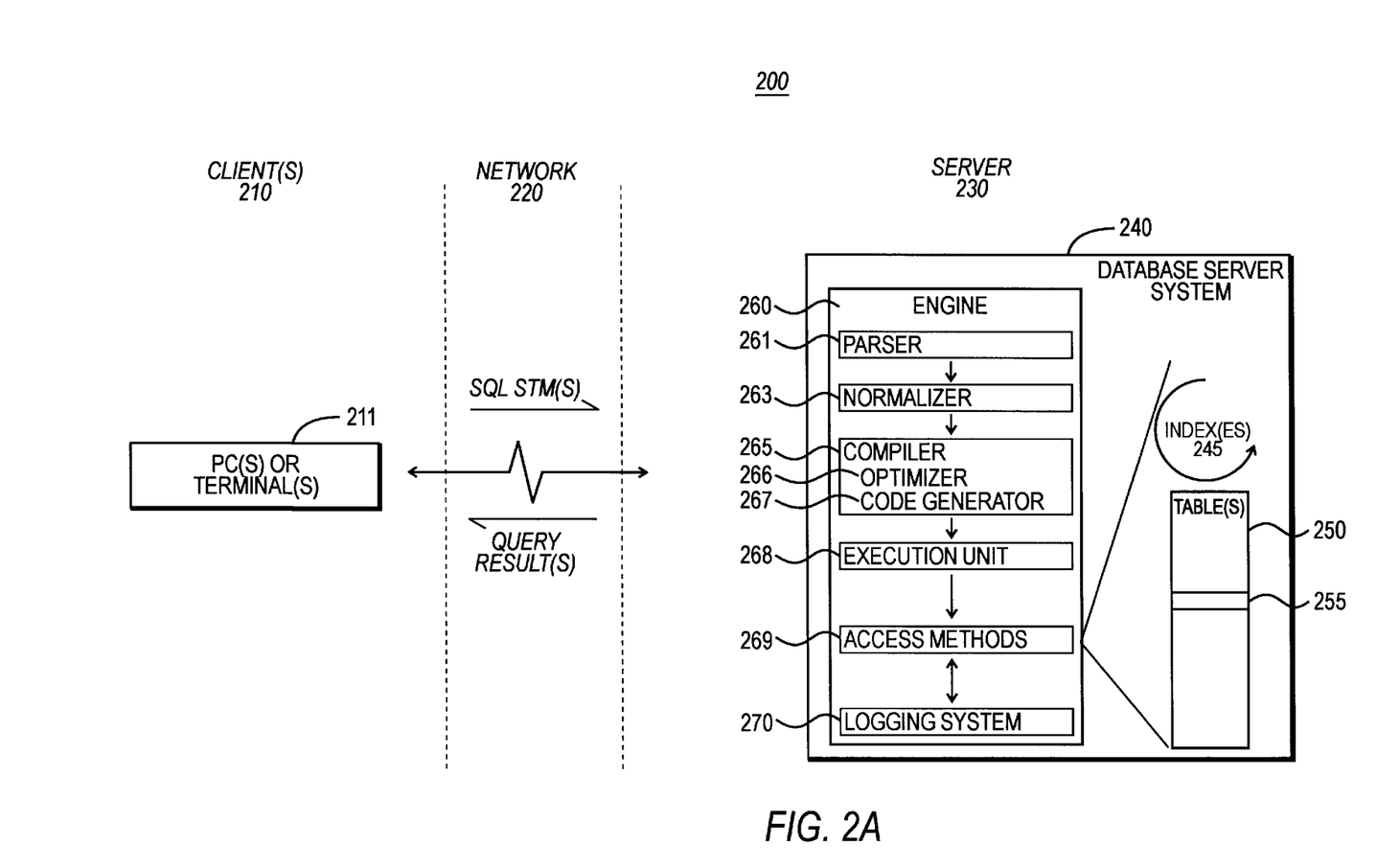
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process(es) (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

During system operation, the SQL statements received from one or more Clients 210 (via Network 220) are processed by Engine 260 of the Database Server System 240. The Engine 260 itself comprises a Parser 261, Normalizer 263, Compiler 265, Execution Unit 268, Access Methods 269, and Logging System 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow.

As transactions are processed by the system, Logging System 270 is used to log changes which occur to the system. In the commercial embodiment of Sybase SQL Server System 11, this is done by posting log records to a transaction log. Every transactional update to an object, including inserts, updates, and deletes, causes a log record to be written to the transaction log or simply "log." In SQL Server, the transaction log is referred to as "syslogs." Each particular log record characterizes the change which has occurred to the database during processing of a transaction. This information can be used, for instance, in error recovery, to restore the database to a pre-existing, consistent state.

The Logging System 270 will now be described in further detail. In particular, the description will focus on improved methods of the present invention for logging transactions.

PLC-Based Logging Subsystem

A. Introduction

Since a log is a shared resource in a multi-user database system, much contention exists for the log, as multiple users desire concurrent access to the log for performing transactions. At the same time, a system must control access to the log for preventing one user from overwriting the results of another user.

The semaphore is employed for controlling access to the log. Often, a dedicated semaphore—a "log semaphore"—is employed for this purpose. The semaphore locks access to the system log table(s) so that a particular task can post log entries, as necessary, without interference from another concurrent task. Such an approach, however, presents a pronounced bottleneck to scalability. Each transaction which wants to write a log record must build the record on its stack, take out the log semaphore, and copy the log record into the page chain (where the log is currently being appended to).

The log itself exists in two versions: an in-memory version and a disk version. The in-memory version of the log exists as a page chain in system memory. Here, data pages storing log records are linked together in memory to form a chain of pages. The in-memory log is flushed, at appropriate times, to disk, for creating the disk version of the log. In typical operation, when a transaction "commits," the log records must first be written to disk before the database system proceeds with actually committing the transaction. "Write-ahead logging" is a rule in the database server governing how a data page (buffer) and its corresponding log records are written to disk. Succinctly stated, the rule dictates that a data page cannot be written to disk until the log records describing the change to that page have been (previously) written to disk. A given transaction will even "sleep" while waiting for its log records to be written to disk. Therefore, the log records must go to disk before the data pages.

Write-ahead logging is implemented by using a "pinning" mechanism. Each data page is associated with a context buffer storing housekeeping information for a data page, including a "log pin." The log pin is a pointer which points to the place in the log indicating up to where in the log the log must be flushed to disk before the data page itself can be written to disk. Until these log records are written to disk, the data page is "pinned" to the in-memory log (i.e., log page chain).

Complementing the notion of pinning is "unpinning." Consider a scenario where a database server's buffer manager desires to write a pinned buffer to disk (e.g., write the page to disk, according to a least-recently used scheme). Before the buffer manager can write that page to disk it should preferably "unpin" the page. As dictated by the write-ahead logging rule, this "unpinning" causes part of the log to be flushed to disk.

Figure 2B:
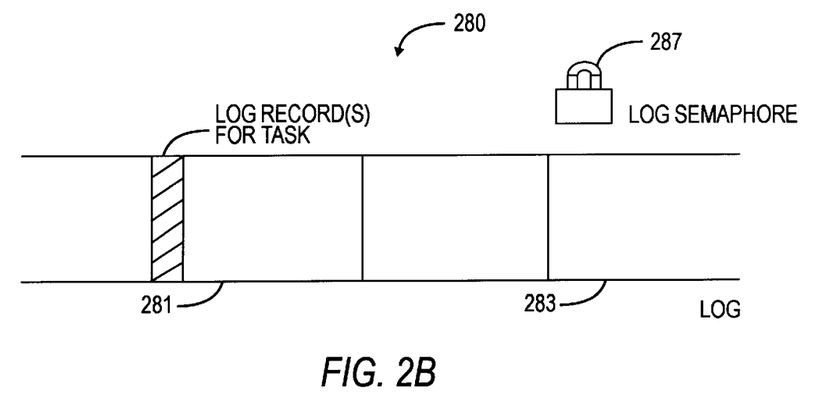
FIG. 2B is a simplified block diagram summarizing data structures conventionally employed for logging transactions.

FIG. 2B provides a simplified diagram summarizing the data structures employed for logging. As shown in FIG. 2B, the system log or "syslogs" comprises an in-memory page chain 280 including, for instance, log page 281 and log page 283. To post log records to the syslogs, a task must take out the log semaphore 287. In particular, as each record is appended to the syslogs, at log page 281, the log semaphore 287 is held. Without further improvement to the logging system, much contention would exist among the various tasks for the log. To provide improved scalability, therefore, one must solve the problem of contention for the log semaphore.

One approach to solving contention for a resource is to split up the resource. For a logging system, for instance, it is possible to employ multiple semaphores guarding different parts of the log. In general, however, a log is a structure where log records are appended to one end. Protecting the log structure with multiple semaphores would require multiple insertion points into the log. As readers of the log, such as recovery systems, rely on the log being sequential (e.g., for "playback" of log records), adding multiple insertion points leads to greater complexity in processing and maintaining the log. Quite simply, destroying the sequential nature of the log would convert it from a simple, easy-to-maintain structure to one which is far more complicated—one requiring complex processing at multiple subsystem levels other than that of the logging system (e.g., such as in the error recovery system). Since the sequential nature of the log is a fundamental property which is highly desirable to preserve, an approach employing multiple log semaphores is not attractive.

Another approach would be for a task to take out a log semaphore but not, at that point, copy the log record into the log. Instead, the task would simply reserve a space in the log structure, which would eventually receive a copy of the log record. Here, the semaphore is not held while copying but, instead, is only held for reserving a space—typically, a much shorter time period. The approach is not without problems, however. In particular, the approach creates "holes" in the log structure. Each hole represents a reserved space in the log which has yet to receive a log record. The approach leads to increased complexity in design and maintenance of the log since additional processing is required for correct treatment of "holes," for instance, during transaction roll back or error recovery.

B. "Private Log Caches"

1. Overview

A logging system, constructed in accordance with the present invention, provides a plurality of user or "private" log caches (PLCs). Instead of a task writing log records into the log page chain, the task instead buffers the log records in system memory. When the task needs to either flush that cache or commit the transaction, the system flushes the log records to the log page chain. At that instance, the task takes out the log semaphore and copies all the log records from the private log cache into the system log. Using this approach, each task requires the log semaphore much less frequently, since the semaphore is only needed at the point where log records are flushed from the private log cache to the log page chain.

Figure 2C:
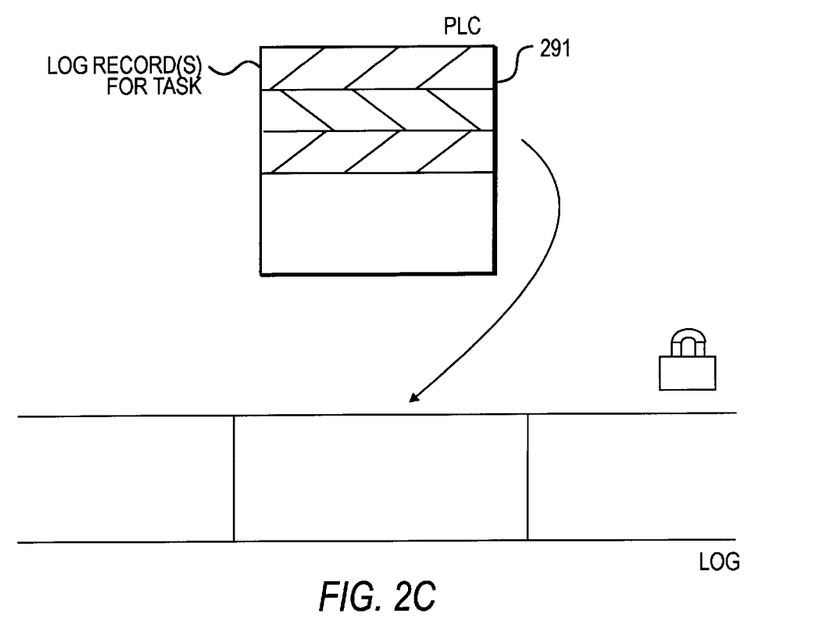
FIG. 2C is a simplified block diagram illustrating improved data structures employed in the system of the present invention for logging transactions.

FIG. 2C provide a simplified diagram illustrating the improved data structures employed for logging in the system of the present invention. As shown, each task writes a generated log record to its own "private log cache"—a region of memory reserved for the particular database connection or "user." For instance, the task first writes its log records to private log cache 291. The log semaphore, shown as 291, is not held by the task during this process. Only when the private log cache for a task needs to be flushed to the actual log is the log semaphore taken out by a task. In instances where a page can be concurrently updated without a transactional lock (e.g., OAM (Object Allocation Map) pages in Sybase SQL Server), the PLC containing log record(s) describing a change to such a page are flushed before the end of the transaction. In either instance, the approach of the present invention greatly reduces contention for the log semaphore.

A consequence of this approach is that log records tend to be much more grouped together. In other words, the log records for a given task or connection will tend to be grouped together as they are flushed as a group from the private log cache of a task to the log page chain. What is important to note, however, is that the sequence of the log records is preserved on a per transaction basis.

2. Basic Logging Data Structures

Figure 3A:
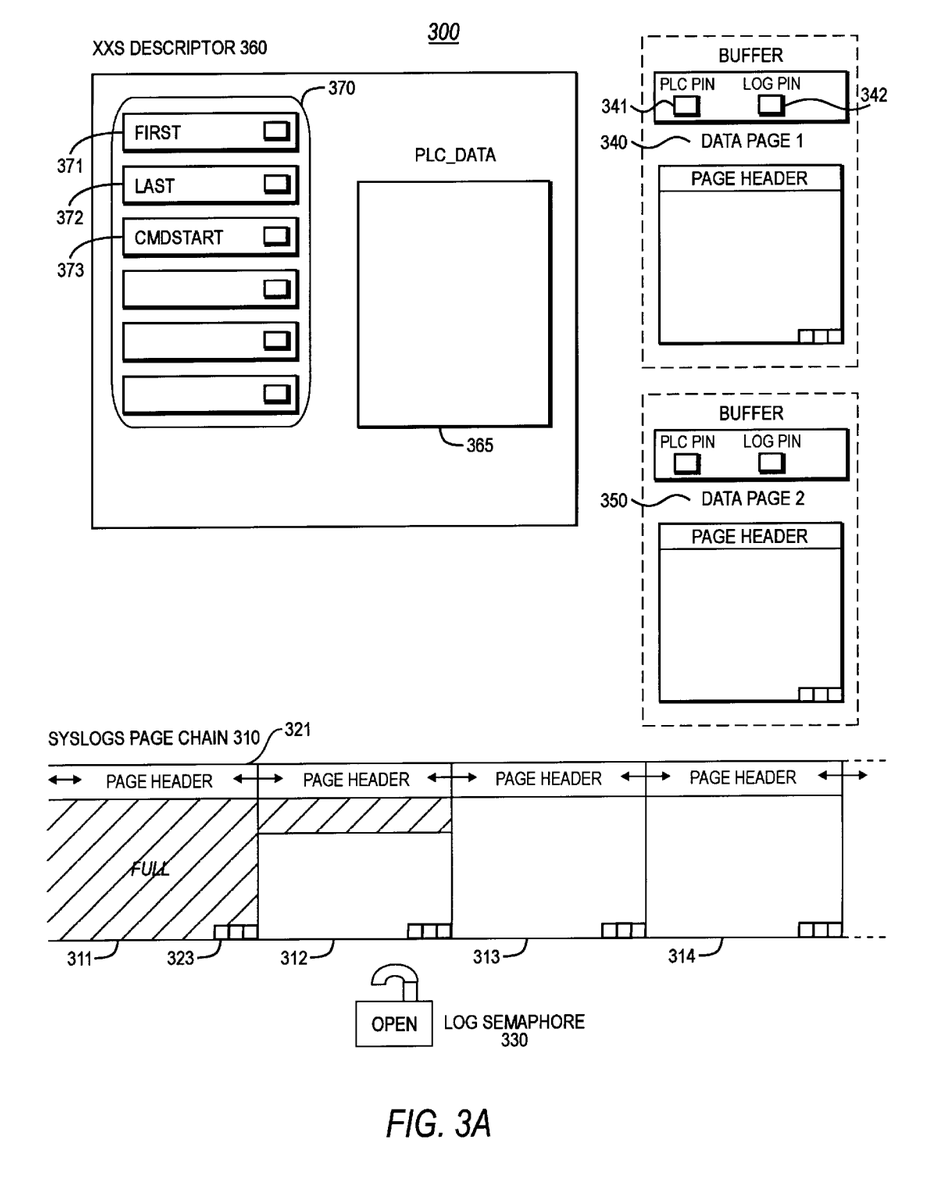
FIG. 3A is a detailed block diagram illustrating improved data structures employed by the system of the present invention for logging transactions.

FIG. 3A illustrates basic logging data structures 300, which interact during system operation. The data structures include a syslogs page chain 310—a representation of the log in system memory. The page chain itself is comprised of individual pages, such as pages 311, 312, 313, and 314. As shown, each page includes a page header (e.g., page header 321 for page 311) which stores housekeeping information for its page. Also shown, each page stores forward and backward pointers for referencing previous and next neighbors in the page chain. Each page also includes a directory or row lookup 323 for locating the particular offset in the page where a given record (identified by row number) is located. Access to the page chain, which is globally shared, is provided through log semaphore 330. By reducing contention for the log semaphore 330, system scalability improves.

The right hand side of FIG. 3A illustrates two data pages: data page 1 (340) and data page 2 (350). Each data page is associated with a buffer data structure which stores information for supporting the in-memory image of the page. Although shown together, a data page image and its corresponding buffer data structure do not necessarily reside in contiguous portions of memory. The information stored by the buffer structure is relevant only when the data page resides in-memory (as opposed to on-disk). Information which is relevant includes, for instance, a PLC pinning flag (e.g., pin 341) as well as a log pinning flag (e.g., pin 342).

The logging data structures 300 also include a transaction logging descriptor (XXS) 360. In an exemplary embodiment, this data structure is linked (via a pointer) to a transaction descriptor (xdes) data structure which completely characterizes a transaction. Implementation of an xdes data structure is described in commonly-owned, co-pending application Ser. No. 08/537,020, filed Oct. 2, 1995, the disclosure of which is hereby incorporated by reference. The XXS data structure, on the other hand, may be constructed as follows (using the C programming language).

```
typedef struct xxs
{
    /* Link for active transaction list - MUST BE FIRST */
    LINK        xxs_activelist;
    /* External data to XLS - none */
    /* Internal data */
    /*
    ** This set remain constant once the XXS object
    ** is attached to the XDES object.
    */
    struct xdes *xxs_xdes;  /* Pointer to attaced XDES */
    struct pss  *xxs_pss;   /* Pointer to task's PSS
                            ** (housekeeping)
                            */
    PLCSTATE *xxs_plc;  /* Pointer to task's PLC */
    /*
    ** This set remain constant during a transaction.
    */
    struct dbtable  *xxs_dbx;  /* Database for transaction */
    /*
    ** This set varies over the life of a transaction.
    */
    struct sdes     *xxs_syslogs_xact; /* SDES for SYSLOGS for xacts */
    uint32          xxs_state; /* State of XLS session */
    int             xxs_plclrn; /* LRN id of first lr in PLC */
    int             xxs_count; /* Total number of lr's written */
    circ_long       xxs_flushseq; /* Current dirty seq. for flush */
    int             xxs_error; /* Error for last failure */
    struct sdes     *xxs_syslogs_scan; /* SDES for SYSLOGS for
                                       SCANs */
    XLSCAN          *xxs_scan; /* Current scan structure */
    uint32          xxs_reqmarkers;
    uint32          xxs_nlreqmarkers;
    XLRMARKER       xxs_markers[XLSM_NUM_MARKERS];
}XXS;
```

The XXS data structure references a private log cache data structure or "PLC object," as shown at 365. This controls the region in memory where the log records are actually cached. In an exemplary embodiment, the PLC object (an object of type PLCSTATE) may be constructed as follows.

---
**

** The PLCSTATE holds the state information for the PLC itself.

-continued

```
**   Each PLCSTATE owns one PLC_DATA object, which is where log
**   records are actually cached.
**
**   XXS <-> PLC synchronisation
**   plc_xkeeper -   Identifies the the XLS session (via the internal
**                   descriptor (XXS *)) that keeps the PLC. This field
**                   may only be changed by the task that owns
**                   the XLS session and only when holding the PLC
**                   lock.
**                   This means that the keeper of the PLC can read
**                   this field without any synchronisation. All other
**                   tasks must grab the PLC lock to see a stable value for
**                   this field.
**                   The PLC at any time is kept by at most one XLS session.
**                   If an XLS session does not have the PLC kept
**                   (plc_xkeeper is NULL), then there can be
**                   no log records in the PLC. The thread owning
**                   the PLC may avoid locking the PLC if the current XLS
**                   session does not have the PLC kept. The assumption
**                   is that other threads have no interest in the PLC
**                   when it is empty.
**
**   plc_lockcount Can only be read and modified under the PLC
**   spinlock.
*/
typedef struct plcstate
{
    /* External data to XLS - none */
    /* Internal data */
    /*
    ** This set remain constant once the PLCSTATE object
    ** is attached to the PLC_DATA object.
    */
    struct  spinlock  *plc_spinlock;   /* Spinlock for PLC */
    BYTE    *plc_start;                /* Start of PLC_DATA */
    BYTE    *plc_end;                  /* End of PLC_DATA */
    int     plc_maxpagecount;          /* Maximum number of
                                       ** log pages required
                                       ** to flush the PLC.
                                       */
    /*
    ** This set is variable during the life of the PLCSTATE
    */
    int  plc_lockcount      /* PLC semaphore count */
    int  plc_waiters;       /* # of waiters for PLC lock */
    int  plc_maxlength;     /* max len of next log rec */
    int  plc_count;         /* # of log records in PLC */
    int  plc_logspace_free; /* number of bytes still
                            ** reserved in log through
                            ** the threshold manager.
                            */
    /*
    ** plc_offset :
    **
    **  if the PLC is not being flushed then plc_offset is the
    **  address where the next log record will be placed in the PLC.
    **
    **  Otherwise plc_offset is the address of the next log record
    **  to be removed from the PLC.
    */
    BYTE       *plc_offset;
    struct xxs *plc_xkeeper;   /* Current XXS keeper of PLC */
    struct pss *plc_locker;    /* Pss of task locking the PLC */
    struct syb_buf *plc_bufhead;  /* Header of pinned buffer chain
*/
}PLCSTATE;
```

Although the PLC is shown inside the XXS data structure, in a preferred embodiment the XXS data structure would instead store a pointer or handle referencing the PLC structure or object.

The XXS data structure 360 also stores or is associated with an array of transaction log record (XLR) markers 370. In a preferred embodiment, the array 370 comprises a fixed array (size=6) XLR markers. Each array entry, which serves as a pre-defined marker pointing to a particular part of the transaction, may be constructed from the following definitions.

```
/*
** XLRMARKER - Log Record Marker - OPAQUE to XLS clients.
**
** Clients of the XLS must not assume or have knowledge of
** any of the below.
**
** Internally a XLRMARKER has two formats, non-permanent and
** permanent.
**
** In the non-permanent form the marker is the numeric
** order of the log record with the first being XXS_LRN_FIRST (==1).
** This is stored in u_xlr_marker.
**
** In the permanent form the marker is the RID of the log record
** (ie. once it has made it to the log page chain). This is stored
** in u_xlr_rid.
*/
typedef     struct xlrmarker
{
    union
    {
        struct
        {
            pgid_t     fakepage;
            int32  u_xlr_marker;
        }s;
        RID    u_xlr_rid;
    }u;
} XLRMARKER;
/* Markers stored in XXS */
#define  XLSM_FIRST 0 /* First log record of transaction */
#define  XLSM_LAST 1 /* Last log record of transaction */
#define  XLSM_CMDSTART 2 /* Client defined CMDSTART */
#define  XLSM_ABORTMARK 3 /* Client defined ABORTMARK i.e.
                          ** a place in log to rollback to
#define  XLSM_LASTSAVE 4 /* Client define LASTSAVE
                         ** i.e. a savepoint in log to rollback to
#define  XLSM_LASTINPAGECHAIN 5 /* Last log record added to
page chain */
#define  XLSM_NUM_MARKERS 6 /* Number stored in XXS */
/* Markers not stored in XXS */
#define  XLSM_SCAN (-1) /* Current log record of log scan */
#define  XLSM_OLDESTXACT (-2) /* Oldest active transaction */
#define  XLSM_LOGLAST (-3) /* Last log record in log page chain */
#define  XLSM_LOGFIRST (-4) /* First log record in log page chain
*/
```

Client code refers to the markers by indexing into the array.

The first three markers are of particular interest to the present invention. The "first" XLR marker 371 points to the first log record associated with a transaction. In a corresponding manner, the "last" XLR marker 372 points to the last log record associated with the transaction. Finally, the "command start" XLR marker 373 points to the log record associated with the first data access/manipulation command of the current SQL statement (e.g., SQL INSERT command).

Figure 3B:
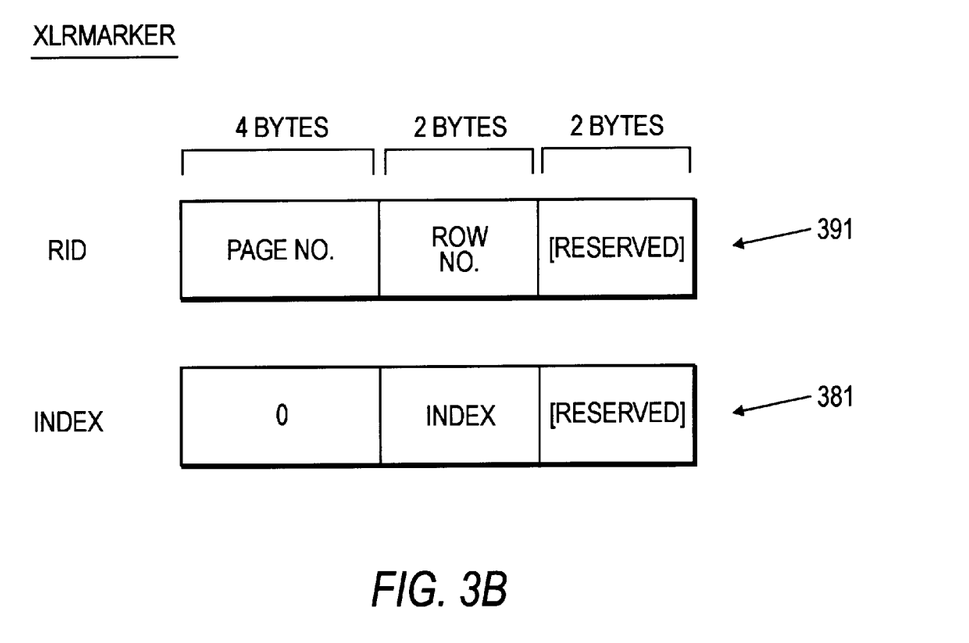
FIG. 3B is a block diagram illustrating a transaction log marker or XLRMARKER employed by the system of the present invention for tracking log records.

As indicated by the definition for XLRMARKER and illustrated in FIG. 3B, each XLR marker can take one or two forms. In a first form, the marker stores a pointer 381 to a log record while the log record is in a private log cache. In an alternative form, the marker stores a "RID"—a record ID—as shown at 391. In this latter form, the marker points to the log record in the page chain by referencing a particular ID of the page together with a row number on that page where the record is located. The index stored by pointer 381, on the other hand, simply is the ordinal number of the log record within the transaction; it is used to locate a record within the PLC.

3. Two-Phase "Pinning" and "Unpinning"

Recall that the "log pin" represents where in the log page chain log records must be flushed to disk before the corresponding data page can be flushed. Besides this mechanism, the present invention introduces a second mechanism. Because log records can reside in a (user) private log cache (i.e., per "user" connection), a mechanism is needed to ensure that such records are flushed (to the log page chain). If a change which affects a data page is represented in a private log cache, the PLC pin for that page will be instantiated and will point to the corresponding PLC_DATA data structure (through the xdes data structure). In this manner, when such a data page is written, the system first unpins the PLC pin, thus causing the corresponding PLC_DATA data structure to be flushed to the log page chain. Now, the data page will get a pin to the log, for indicating where in the log records must be flushed in order to write the data page. The addition of the second pointer to the data page buffer provides a two-phase unpinning mechanism. Unpinning a page now requires that the corresponding private log cache (i.e., the one being pointed to by the pointer stored in the page) be first flushed to the log page chain. Secondly, the in-memory log itself is Log Translation A. Need for Log Translation Log records might need translation for a variety of reasons. Consider, for instance, the following log records.

TABLE

V10_1xxx log record structures

| V10_1_xxx log record structure | Need for translation (see below) |
| --- | --- |
| V10_1_XALLOC | b) |
| V10_1_XCHANGE | a) |
| V10_1_XDROPCOL | a) |
| V10_1_XEXTALLOC | b) |
| V10_1_XNOOP | a) | a) A new field has been added, and while it is unused by Recovery, it could not be introduced at the end of the structure, because there is a variable-length field, which of course must be at the end. As a result, the displacement of data needed by Recovery means the record must be translated so that Recovery will find the data at its expected offset; or b) A new field is introduced and is used by Recovery. Recovery accepts a default value of zero for the field. Translate methods need not know the new field's identity; they need only MEMZERO the translation buffer and map the prior version (V10_1_Xxxx) fields into the current version (System 11) structure; or c) A new field is introduced and is used by Recovery, and Recovery cannot use a default of zero. Here, the translate method must synthesize a reasonable value for the new field. Even if reasonable values can be synthesized, having to know about fields unique to the output structure makes the translate methods less maintainable; or d) The log record format has not changed, but an existing field has been given a new use. This is the case for the XSORTREC structure, which is not treated by the Table 1.1, since there is no V10_1_ version of this log record. In XSORTREC, a field that is uninitialized storage prior to SQL Server version 10.1 becomes meaningful in 10.1. SQL Server Version 10.1 has no Log Compatibility module, so its do layer must clear this field to its default, zero, value, when it detects an XSORTREC record of pre-10.1 provenance. In System 11, this task is moved out of the do layer into a log translation method.

B. Approaches of Prior SQL Server Architecture

1. Prior system (e.g., System 10) invalidated customer dumps

Before describing preferred methodology of the present invention, it is helpful to review approaches of prior versions to addressing the problem. One approach to log compatibility is to simply have the new system not support the prior system. For instance, in the design of a new system, the new system can be designed such that a "load" of database "dumps" created by previous versions would not be recognizable. Such an approach, however, is unlikely to be unacceptable to customers. Instead, customers require that dump compatibility be maintained from one version to the next. Since a DUMP DATABASE performed against an active database requires log recovery, a dump with incompatible log records cannot be recovered by LOAD DATABASE recovery. Without log translation, a prior system's dumps might not be compatible. As a result, the marketplace demands that database designers not invalidate dumps of the preceding release.

2. Previous Attempt at Handling Changes to Log Records

In earlier SQL Server architecture, an attempt at handling changes to log records (e.g., in SQL Server 4.0) tried to cope with the replacement of a pad spare by a status word in the generic LOG header that is found up through and including System 10 log records. The spare was uninitialized in customer databases. The 4.0 implementation of a text/image feature required a status bit to indicate a second flavor of an existing logop. The implementors added not only a "text" bit, but also a "this status word is not garbage (honest)" bit in the same field. Then, to reduce the chance that this second bit might be garbage, log record readers came eventually to test for bits in a complementary "must be zero" mask, reasoning that at least the probability of error would thereby be reduced.

Realizing the difficulty presented by uninitialized storage, one might have assumed that the 4.0 implementation must have included the effort to modify every SQL Server log writer to initialize the new generic status word. Such an assumption would be incorrect, however. As late as System 10, there are still log writers which did not initialize that field. In System 11, the XLS implementation finally meets this modest standard.

C. Alternative Strategies

1. Maintain Log Version at the Log Record Level Instead of the Database level

Version bits could be inscribed in the generic log header status word, which System 11 puts under control of the log translation system or XLS. A "master bit", one with no meaning prior to System 11, would indicate that the log record version incorporates this log record version bit scheme; without the bit, the log record would be taken to be of pre-System 11 vintage. If there were no future need for new other-than-log-version bits in that space, there would be at least eight log versions that could be defined before value rollover.

The approach has pronounced disadvantages, however. The issue of possible variances in physical log record format should not encumber record-by-record log reading and writing. In general, special case logic should intrude on mainline code as little as possible, especially at low level. The design which is preferred should impose no special case logic on log record writes, and allow the chance of avoiding it for reads in a future amendment by a more innovative designer. As another disadvantage, the version-bit approach is impracticable, since the contents of the log header status word in SQL Server versions prior to System 11 can be garbage for many logops. The master bit would suffer from the same ambiguity as the "this status word is not garbage" bit.

Preferred Log Translation Methodology

A. Overview

Implementation of the methodology of the present invention is facilitated by the log translation system or XLS. In the presently-preferred embodiment, therefore, this feature is checked in before the "Log Compatibility" module is invoked. XLS imposes a discipline on log reading that allows simple, easy mapping of Log Compatibility resources and entry points. The ONLINE DATABASE command, which shares Log Compatibility's ECO, is required in order to create the quiescent-Checkpoint boundary which prevents Recovery from reading both old- and new-format log records. It also ensures that the correct set of this module's log translation methods is installed, by calling the Log Compatibility module to install the appropriate log translation methods each time it modifies the value of the log version field in the database table (dbtable).

In accordance with the present invention, the logging system is modified as follows. An XLS (transaction logging system) method is provided which enforces a single entry point for log readers, enabling virtual transparency of the translation module. Underneath that entry point, XLS invokes a "Log Compatibility" module when necessary, with XLS client code (i.e., internal SQL Server client modules) largely unaware of the automatic translation. The XLS design previously added XLSCAN to each log reader's stack space. Log Compatibility replaces XLSCAN with a higher-level structure (LOGSCAN) incorporating both the XLS-dedicated XLSCAN and a Log Compatibility translation buffer (XRECORD). As a result, memory allocation for the buffer is achieved one-for-one with each instance of a reader of a log record, transparently to that client code (since the XLS design had already required that log readers declare a scan structure before Log Compatibility came along). XLS links the translation buffer to the XDES with no conscious involvement by the internal client; underneath XLS, the buffer is filled and its address returned as a log record pointer with no visible client code aware of the concept.

Although XLS clients, upon receipt of a log record pointer, could perform their own log translation based upon their own detection of the log incompatibility state, such an approach is undesirable. Providing special-case log format translation considerations in other logic layers is highly undesirable, as maintenance would become significantly more difficult. Thus, log-reading XLS clients preferably would not do their own log translation.

Log version information, DBTABLE.dbt_logvers, is maintained by ONLINE DATABASE and the DB manager to indicate the provenance of the log records in the active portion of the log. ONLINE DATABASE, a command which indicates that the load sequence is over, writes a quiescent log record indicating that nothing occurred before that log record. If necessary, it will install a new log identifier. During Recovery, encounter of the identifier will cause new log translation methods to be employed. It in effect serves as a fire wall keeping Recovery from looking at log record versions which do not match the version installed in the database.

If DBTABLE.dbt_logvers differs from the defined constant CUR_LOGVERS_ID, then the database is in a log incompatibility state. Log record translation is performed by per-logop translation method functions, invoked by using the logop as an index into an array of function pointers. This invocation is performed by a translate get next method, xls_getnext(), as its last act before returning control to its client, when the database is in a log incompatibility state. DBTABLE.dbt_logxlate is a pointer to such an array. It is made non-null whenever dbt_logvers receives a value that creates a log incompatibility state. In System 11, this event occurs when Recovery is about to commence after the load of a dump that was created by System 10.

B. Basic Operation of Core Methods

Figure 4:
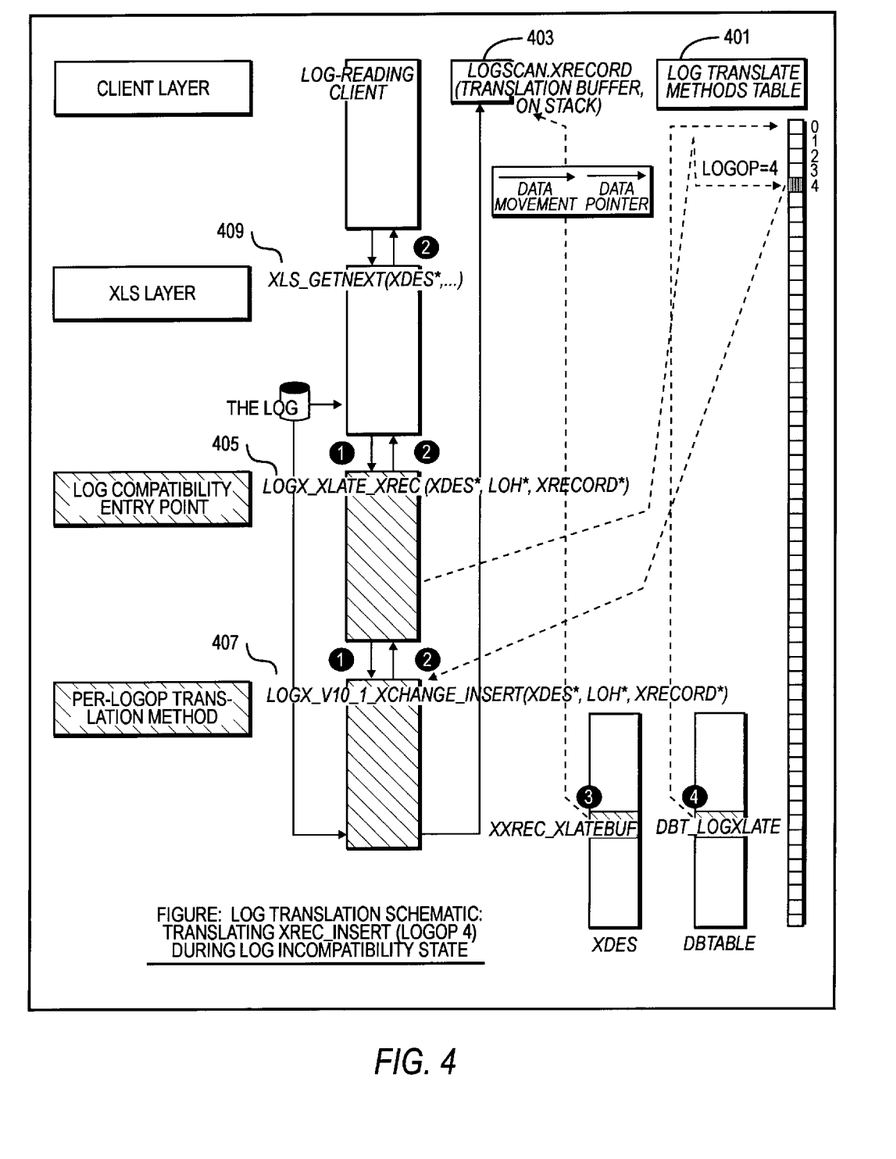
FIG. 4 is a high-level diagram illustrating internal data structures and methods which operate for translating log records when there is a skew or difference between a system version and that of log records begin processed.
Figure 5:
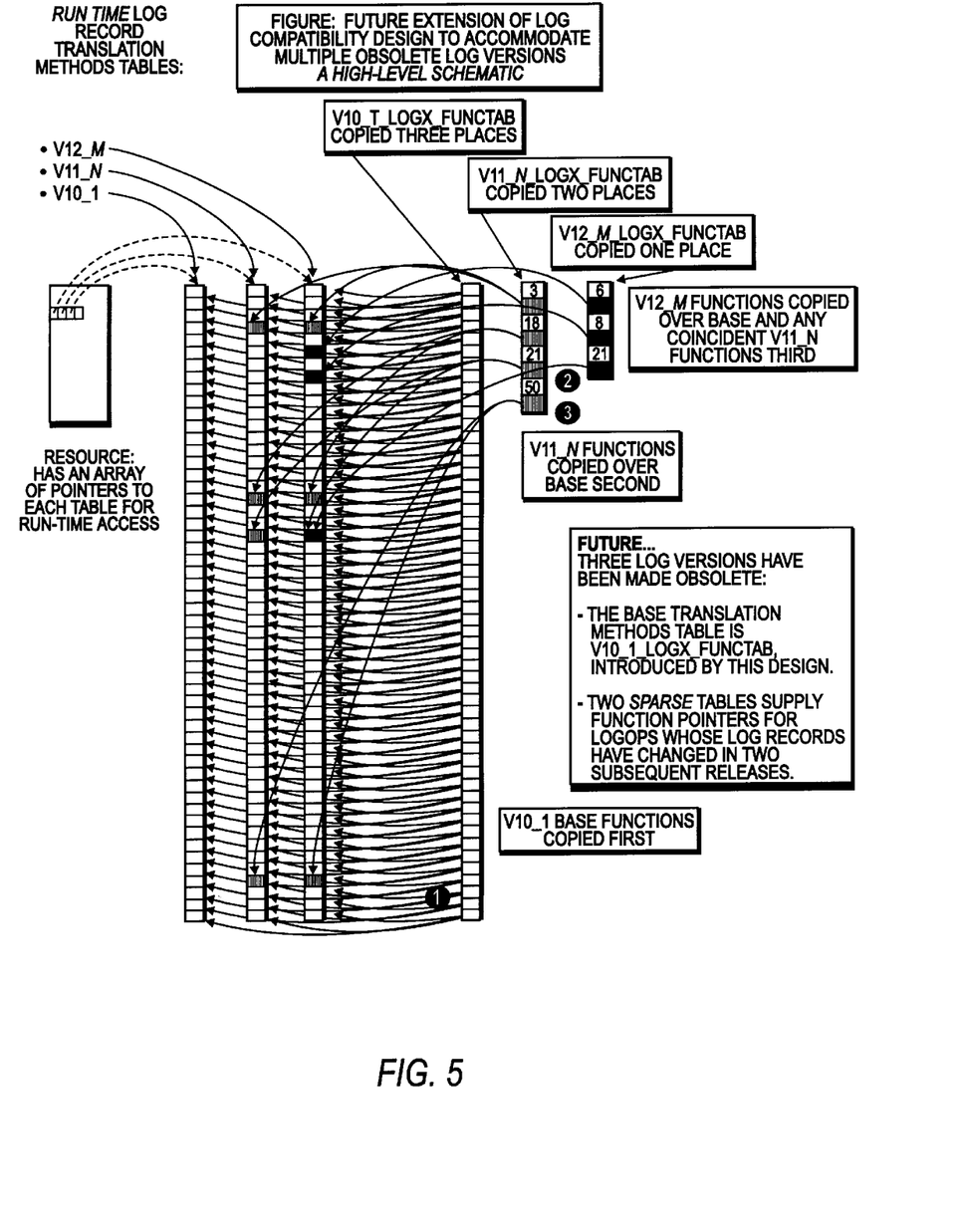
FIG. 5 is a high-level diagram illustrating use of a set of translation tables defined at run time, each one for supporting a particular version of the log record.

FIG. 4 illustrates a high-level diagram for internal data structures and methods which operate for translating log records when there is a skew or difference between a system version and that of log records begin processed. As shown in FIG. 4, when such a difference exists, *Translation Methods Function Table* 401 is instantiated. The table is a table of functions (pointers), one per logop. The logop, which is a single byte value, can be used as an index into the table. For instance, the value of zero defines the log operation for "began transaction" or BEGIN_XACT log record. Therefore, the first entry in the table is one for translating a BEGIN_XACT log record. As shown in FIG. 5, a set of translation tables can be defined at run time, one for each version being supported.

During the case that a log incompatibility state exists in a database, XLS operation takes a detour into the Log Compatibility module for performing appropriate translations. In the XLS client's stack space, hidden from client code, is a buffer 403 in FIG. 4 in which a reformatted log record can be stored. A translate method installed for the current logop is called; it procures from the passed-in XDES a pointer to that buffer, and reformats the log record into that space. XLS returns to the client a pointer to a reformatted log record in its own stack space, with the client largely unaware of the issue. As shown in the figure, for instance, the system indexes into the fourth entry. The method performing this indexing is a translate method, LOGX_XLATE_XREC (405). As shown at 407, this entry references a translation function, LOGX_V10_1_XCHANGE_INSERT, which performs log translation for, in this example, an insert log record. In this manner, each op code indexes (in natural order) into an array or table which, in turn, references particular methods which perform the translation. What the client (caller) gets back is a pointer to the translated log record in the client's stack space.

All log reader access is preferably funneled through xls_getnext(), shown at 409. Via an ONLINE DATABASE command, a quiescent Checkpoint record establishes a clean boundary between old log records and new, such that Recovery will read log records only from one version or the other, and not both. Private log cache (PLC) and log-record-reading trigger code will never be active at the same time as log translation methods, since those two components operate only after the database has come on-line. Replication, which can ignore the log boundary created by ONLINE DATABASE's Checkpoint Record, or SQL Server, ensures that all of a replicated SQL Server database's log has been transmitted to persistent Replication storage, and that its persistent start-of-the-log pointer is updated, before the upgrade to the next SQL Server version is begun. In this manner, when the database system of the next version begins transmission to the Replication Server, it will read only new-format log records, generated after the boot of the new executable. The PLC and the trigger code that reads log records have no impact on Log Compatibility design, because both operate after a database has come on-line, when a log incompatibility state cannot exits.

In the preferred embodiment, great effort is taken to avoid exposing log readers to log format translation issues. For most log records, log reader code does not change. A few readers, of log records with variable-length data fields, access those data fields via macros that disguise the location of those fields, which may not be in the C data structure in which they were written. To this end, the XLS serves as the sole main-line interface with the Log Compatibility module. On behalf of the Log Compatibility module, xls_startscan() inserts into the XDES a pointer to the client's translation buffer. Just prior to concluding execution, xls_getnext() performs a single function call to logx_xlate_xrec() if SQL Server is in a state of log incompatibility. On behalf of the Log Compatibility module, xls_endscan() clears the XDES pointer to the client's translation buffer, as illustrated in the figure.

C. Implementation

1. New Data Structures

An XRECORD data structure is introduced as a union of all log record structures. It is used to define a translation buffer into which the log translation methods can deposit a translation of a prior system's log record (e.g., in System 10). This union is desirable even without Log Compatibility, simply to improve log record pointer data typing. Prior to XLS, log scans unqualified by logop (which would connote an expectation of the logop's associated C structure type) are typed as (LOG *), because that header structure was held in common by all records. XLS removes the header from public view, so the initial implementation of XLS could only give its clients a (BYTE *) as a generic log record handle. The Log Compatibility implementation changes the XLS scan API (application programming interface) so that xls_getnext() returns an (XRECORD *). As an additional benefit, Log Compatibility removes from the highest-level do layer functions, and other log reading functions with a use for more than one logop, casts in the following in style:

if (loh·loh_op = = XREC_MODIFY)

do_row((XCHANGE *) xp, ···);

in favor of the following safer style (with corresponding mnemonic change):

```
if (1ch.loh_op == XREC_MODIFY)
 do_row (&xrec->xchange, ...);
``` thus, achieving better log pointer data typing.

A LOGSCAN data structure is provided which incorporates the XLSCAN structure required of each log reader. It adds the XRECORD union of all log record structures, a buffer into which the Log Compatibility methods can deposit their work. This design replaces each xls_startscan() caller's XLSCAN declaration with a LOGSCAN declaration. By replacing one opaque datatype with another, this design unobtrusively plants storage for expanding each log record returned by xls_getnext(), when the log incompatibility state exists. This buffer is only used when recovering a database whose log records were written by SQL Server version with different log record formats. It is not used in a database that is on-line.

For supporting their versions, System 10 log formats are provided (typically implemented in a separate header file, logxlate.h). The log record structures in this file are the System 10 versions of log record structures that are seen with a different format in the System 11 version of log.h. Also included is the System 10 generic "log header" structure which is not seen in System 11 log.h, because that portion of each log record is held in private by the XLS. Their names take a prefix indicating the latest SQL Server version in which they would been used at the time of the prefix was needed by the Log Compatibility implementation. There could be a SQL Server released later than the version indicated by that prefix which nonetheless uses these formats, but its release would have occurred after this prefix had been chosen.

V10_1_LOG is the System 10 generic log header structure (LOG). V10_1_LOG is required by each System 10-format log record structure definition, and is also directly required by the log translation methods, because its internals are required in the System 10 approach to determining correct logical record lengths. The other structures prefix "V10_1" to structures names identical to the those of the System 11 log records to which they correspond. They allow access to these System 10 log records in log disk buffers as sources for remapping their fields into System 11 log record structures.

2. Changes to Existing Data Structures: Variable Fields Become Unions

Issues regarding variable-length data fields in log record structures require special attention since this area is prone to errors in implementation and maintenance. XCHANGE.xchgtype, XDROPCOL.xdata, and XNOOP.xnoopins each represent a variable field that typically extends beyond the end of the C structure defined for the log record. Since there is no fixed end of the structure as it is actually used, there is no clean way to append a new field at the end. So, a new field added to each of these structures by System 11 is placed before the end, displacing the variable-length field from its location in the previous log version. Reformatting is required in order for log recovery to find the data in log records of the previous format.

The data in these variable-length fields should not be stored directly in the translation buffer. With such a data field, a log record can approach SYBPAGESIZE, which would be too much to allocate on the stack. Thus, only the fixed portion of the log record is reformatted into the translation buffer. In such a reformatted log record, in place of the data found embedded at the end of a current-format log record, is a pointer to the data field in the original, untranslated log record in the log I/O buffer. Hence, these log structures are defined with unions for the variable data field.

By way of example, the following is the simpler, pre- Log Compatibility XCHANGE.xchgtype union; it serves four styles of XCHANGE use. Two styles use variable data fields:

```
union xchgtype
{
  struct xins ind
  {
    XLRMARKER      xptr;       /* log row pointer */
    int16          xdatarnum;  /* data row number */
  } xinsind;                   /* for INSIND */
  BYTE           xrow[2];      /* for INSERT, DELETE,
                                  IINSERT, IDELETE */
  int16    xvallen;    /* for MODIFY */
  pgid_t   xnewpg;     /* for SPLIT */
} xchgtype;
```

The following is the XCHANGE.xchgtype union modified by the Log Compatibility design: xrow and xvalue themselves become unions:

```
union xchgtype
{
  /*
  ** For INSIN), INSINDTEXT
```

```
       */
      struct xinsind
      {
         XLRMARKER   xptr;        /* log row pointer */
         int16       xdatarnum;   /* data row number */
      } xinsind;
      /*
      ** For INSERT, DELETE, IINSERT, IDELETE, TEXTINSERT,
TEXTDELETE
      */
      union xrow
      {
         /* Embedded, variable, BYTE array
         ** This is how data is stored on disk.
         */
         BYTE        xvalue[2];
         /* Pointer to BYTE array on disk --
         ** used if translated form of log record
         ** is necessary.
         ** This field not seen on disk.
            */
         BYTE *xvalueptr;
      } xrow;
      /*
      ** For MODIFY, OAMATPUT
      */
      struct modifychg
      {
         int16       xvallen;     /* length of each of
                                  ** old and new values
                                  */
         union xvalues
         {
                     /* -Two- arrays, each xvallen bytes long,
                     ** concatenated into one array, which
extends
                     ** off the end of this log record
structure.
                     ** Old value array at offset xvalues [0].
                     ** New value array at offset
xvalues [xvallen].
                     ** This is how update values are stored on
disk.
                     BYTE xvalues [2];
                     /* Pointers to values on disk --
                     **used if translated form of log record
                     ** is necessary.
                     ** This structure not seen on disk.
                     */
                     struct xvalueptrs
                     {
                        BYTE *xoldvalptr;
                        BYTE *xnewvalptr;
                     } xvalueptrs;
                  } xvalues;
         } xmodifychg;
         /*
         ** For SPLIT
         */
            pgid_t xnewpg;
         xchgtype;
```

Note this positive benefit from having to define a union with pointers for variable data fields: for XREC_MODIFY and XREC_OAMATPUT, explicit data fields must also exist, where before Log Compatibility, the entire data field(s), even the beginning, was implicit.

Similarly to its XCHANGE.xchgtype modifications, Log Compatibility transforms the two-byte "xdata" fake array at the end of XDROPCOL into this union:

```
union xdata          /* beginning of dropped data */
{
   /* Embedded, variable, BYTE array
   **This is how data is stored on disk.
   */
   BYTE        xdata[2];
   /* pointer to BYTE array on disk --
   ** used by log readers if translated
   ** form of log record is necessary.
   ** This field not seen on disk.
   */
   BYTE        *xdataptr;
} xdata;
```

XNOOP.xnoopins changes form in the same way XDROPCOL.xdata changes form.

A fixed, 60-byte array at the end of XBEGIN_EXT is made variable, by replacing it with the standard fake two-byte array seen at the end of other log record structures with variable fields. This change reduces the hit on process stack space made by the LOGSCAN structure's XRECORD union.

3. Methods (pseudo code)

Methods are described using pseudocode. The pseudocode descriptions for several functions include the statement, "use' unneeded<variable>". These statements indicate code in the form "varname=varname". All functions installed in the translate methods table fit the same prototype, but a few do not need all their arguments.

a. Log Translate Methods

The procedural flow for a single log translate method, with the generic log translate method function prototype given in dbtable.h to define DBTABLE.dbt_logxlate is illustrated by the following function prototype and pseudo code.

```
typedef union xrecord * (*LOGXLATEFNPTR)
   PROTO((struct xdes *, struct loh *, union xrecord *));
      Overstore translate buffer with zeroes. There will be a value of zero
      in any field that is defined only in the output (newer) format.
      For each field in old format
         If field is fixed-length
            copy field from old format in log page buffer
               to new format in translation buffer
         else
            copy address of variable-length field in log page buffer
               into new format's unioned BYTE array/BYTE pointer
               in translation buffer
      calculate logical record length for new format
      store adjusted logical record length into client's LOH.loh_len
      Set "record has been translated" bit in LOH.loh_status word;
      this activates translation macros for variable-length fields
      return pointer to translate buffer
```

This functionality is split out into subroutines wherever it is shared with other logop/log structure mappings/methods.

b. Aberrant Log Translate Methods

These functions are installed in the log translate methods table, but their pseudocode differs from the template shown in the Log translate methods section above.

(1) logx_v10_1_xbegin_beginxact

This is a log translation module, but it does not remap fields into the translate buffer. It exists only to recalculate the logical record length per the System 11 logical record length formula.

```
XRECORD * logx_v10_1_xbegin_beginxact (xdes, loh,
unxlated_xrec)
   "use" unneeded xdes
   get logical trnsaction name length from unxlated_logrec
      per System 10 logical transaction name length formula
```

-continued

```
    using logical tranaction name length,
        put logical record length into loh.loh_len
        per System 11 logical record length formula
    return
```

(2) logx_v10_1_xinooptext_inooptext

Like logx_v10_1_xbegin_beginxact(), this method translates only the logical record length, and not the log record itself. Its pseudocode is identical, even to the extent of referencing "transaction name".

(3) logx_v10_1_xsavept_savexact

Like logx_v10_1_xbegin_beginxact(), this method translates only the logical record length, and not the log record itself. Its pseudocode is identical to that for logx_v10_1_xbegin_beginxact(), except that it replaces "transaction name" with "data".

(4) logx_v10_1_xsortrec_sort

This function performs translation in that it copies from the log I/O buffer into the log translation buffer. However, this act is conditional, and there is no difference between the input and output log record formats.

```
XRECORD * logx_v10_1_xsortrec_sort (xdes, loh, unxlated_xrec)
if (xdes->xdbptr->(dbt_logvers >=
MROWSPG_SUPT_LOGVERS_ID)
    return unxlated_xrec
else
    structassign unxlated_xrec to xdes->xxrec_xlate
    zero output XSORTREC.xsoindex.indmrowsperpg
    set LHSR_XLATED in loh->loh_status
    return xdes->xxrec_xlate
```

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system, said database system maintaining a log for recording transactions which occur in said system, an improved method for translating logging information from one version of the system to another, the method comprising:

storing information about the transactions which occur in the system as a plurality of log records, each log record having a particular log record type and being associated with a particular version of the system in use when said each log record is created;

receiving a request to process a particular set of log records;

determining for said particular set of log records whether a different version of the system was in use to create the log records;

if the determined version is different from the current version of the system, establishing a translation methods table, said table having one entry for each particular type of log record, wherein each entry references a particular translation method for each particular type of log record;

receiving a request for access to said particular set of log records; and     in response to said request, providing access to logging information which has been translated to the current version, by performing for each log record the following substeps:

determining a type for the log record;

based on the determined type, determining a particular translation method for the log record;

translating logging information in the log record to the current version by invoking said particular translation method; and         satisfying said request by providing access to the translated logging information.

2. The method of claim 1, wherein each type is identified by a particular value and wherein said step of determining a particular translation method for the log record comprises employing the particular value to index into the table.

3. The method of claim 1, wherein said log records are stored sequentially by the system.

4. The method of claim 1, wherein the system inserts a checkpoint record into the log, the record specifying a particular version of the system that log records have been created with.

5. The method of claim 1, wherein said translated logging information is provided in a buffer local to whatever process has submitted the request.

6. The method of claim 1, wherein each entry references a particular translation method for each particular type of log record by storing a pointer to that particular translation method.

7. The method of claim 1, wherein said translation methods table comprises a plurality of tables, one for each version of the system encountered in the set of log records.

8. The method of claim 1, wherein said providing access step occurs in a manner which is transparent to whatever process requested access to the set of log records.

* * * * *